United States Patent [19]

Meyer

[11] Patent Number: 5,396,945
[45] Date of Patent: Mar. 14, 1995

[54] DRIVE MECHANISM FOR SLATTED BLINDS

[75] Inventor: Pieter N. Meyer, Herwijnen, Netherlands

[73] Assignee: Allpac International B.V., Raamsdonksveer, Netherlands

[21] Appl. No.: 86,508

[22] Filed: May 24, 1993

[30] Foreign Application Priority Data

Jun. 4, 1992 [NL] Netherlands ............... 9200983

[51] Int. Cl.[6] .................................... E06B 9/26
[52] U.S. Cl. .................................... 160/177
[58] Field of Search ............ 160/177 R, 176.1 R, 160/172 R, 168.1 R, 173 R, 170, 178.1 R

[56] References Cited

U.S. PATENT DOCUMENTS

| | | |
|---|---|---|
| 4,122,885 | 10/1978 | Marotto . |
| 4,245,687 | 1/1981 | Vecchiarelli .................. 160/177 R |
| 4,406,319 | 9/1983 | McNiel et al. .................. 160/177 R |
| 4,541,468 | 9/1985 | Anderson ..................... 160/177 R |
| 4,676,292 | 6/1987 | Valle et al. ................. 160/177 R X |
| 4,955,248 | 9/1990 | Lindstrom ................... 160/177 R X |
| 5,139,072 | 8/1992 | Marocco ..................... 160/176.1 R |

FOREIGN PATENT DOCUMENTS 2437018 9/1975 Germany .
2145141 8/1983 United Kingdom .

*Primary Examiner*—David M. Purol
*Attorney, Agent, or Firm*—Brooks & Kushman

[57] ABSTRACT

A self-contained drive mechanism for slatted blinds has a housing with spaced apart cylindrical bearings, and a pair of interfitting bushes disposed in the housing and supported on the cylindrical bearings, and with the connection between the bushes including a flexible torque limiting drive to prevent overloading the slat mechanism.

3 Claims, 2 Drawing Sheets

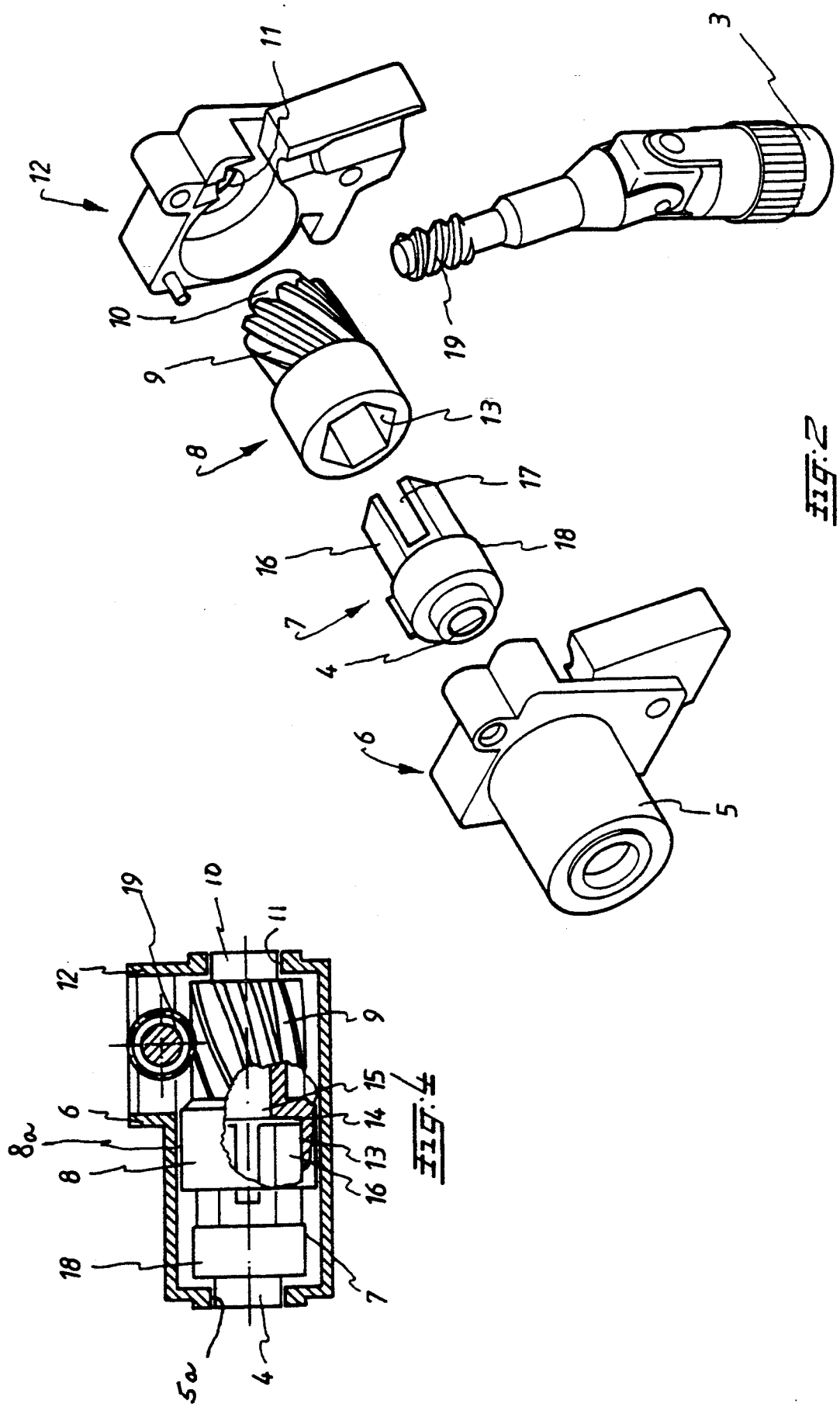

DRIVE MECHANISM FOR SLATTED BLINDS

STATE OF THE ART

The invention relates to a mechanism for transmitting a rotary movement between a driving shaft and a driven shaft, provided with a rattling slip coupling as a protection against overloading.

Rattling slip couplings exist in various forms. They have different drawbacks, most of which have to do with being too complicated and taking up too much space, leading to a relatively high cost.

THE OBJECT OF THE INVENTION

The object of the invention is to provide a rattling slip coupling which overcomes the afore-mentioned drawbacks and which is extremely cheap to manufacture while still, of course, functioning reliably and having a long service life.

SUMMARY OF THE INVENTION

The transmission mechanism according to the invention is characterised in that the rattling slip coupling is formed by a bush with an internal cavity with polygonal cross-section at the side of the one shaft and at the side of the other shaft a second bush made of resilient material of corresponding polygonal external cross-sectional shape, which fits inside the abovementioned cavity of the first bush and is provided with at least two incisions parallel to the direction of the shaft, of sufficient breadth to permit bending of the material parts lying between them, in order to permit continuing turning in the cavity of the first bush.

The corresponding polygonal shape in this case ensures that the couple is transmitted, while the incisions in the second bush, made of resilient material, give the possibility of moving the remaining parts of the second bush inwards, and thereby the possibility of continuing turning in the event of the load being too great.

The polygonal shape is preferably a hexagonal shape, in which case it is then sufficient to provide only two incisions lying diametrically opposite each other.

In particular, the first bush can also form part of a gear wheel, or it can be integral with a gear wheel in the transmission mechanism. This gear wheel can be a pinion in the case in which the driving and the driven shaft are at right angles to each other.

The latter is the case in particular in the particularly advantageous application of the mechanism according to the invention, namely as a drive mechanism for slatted blinds, more particularly horizontal slatted blinds. These were hitherto not provided with a safety device to prevent overloading. The mechanism according to the invention provides this, while the cost of the mechanism is virtually the same as the cost of the old drive mechanism without safety device.

The invention will be explained below with reference to the appended drawing of an example of an embodiment.

SURVEY OF THE DRAWINGS

FIG. 2 shows the device of FIG. 1 with dismantled parts;

FIG. 4 shows an axial section along the plane

THE PREFERRED EMBODIMENT

Figure 3:
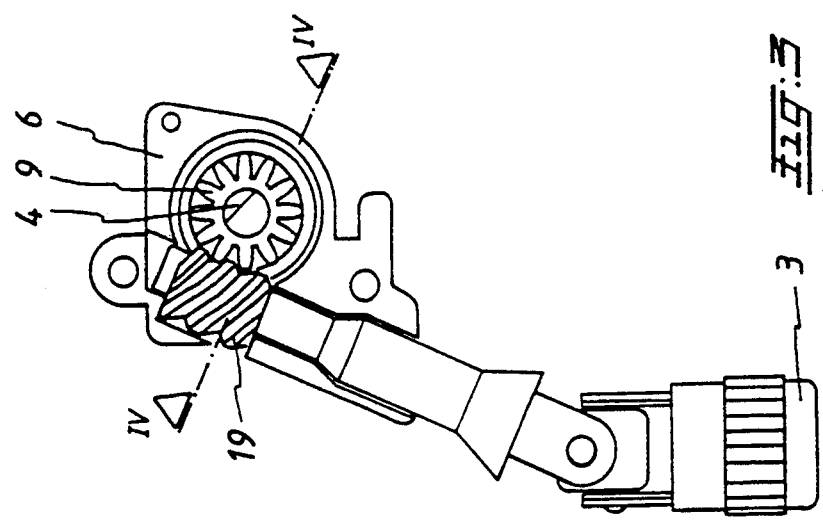
FIG. 3 shows a cross-section thereof, at right angles to the direction of the driven shaft.
Figure 1:
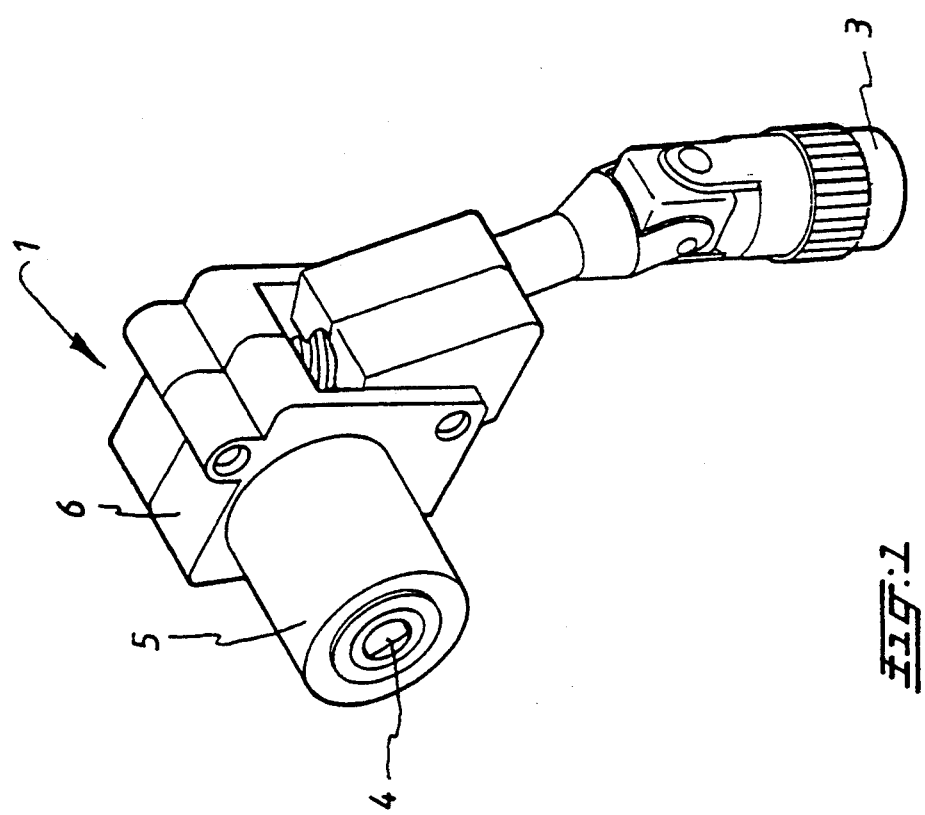
FIG. 1 shows a drive mechanism for horizontal slatted blinds, provided with a rattling slip coupling in the preferred embodiment of the invention.

The housing 1, consisting of two parts, comprises a transmission mechanism for a rotary movement. The element 3 of a universal joint forms the driving shaft, and the driven shaft can be inserted into an element 4 situated in a cylindrical projecting part 5 of the one housing part 6. A driving means such as a rod can in a known way, be inserted in a receiving bore in element 4 or otherwise connected with element 3. The driven shaft, not represented, can be part of a slatted blind system.

As can be seen from FIGS. 2 and 4, the part 4 forms a cylindrical bearing portion supported in complementary cylindrical bearing surface 5a in the projecting part 5 and forms part of a bush 7 which is insertable into a bush 8. The latter is provided, at the side facing away from the bush 7, with a pinion 9 with a projecting cylindrical bearing portion 10, by means of which the bush 8 can be supported in an opening 11 having a cylindrical bearing surface in the other housing part 12 as shown in FIGS. 2 and 4.

Bush 8, which in the claims is indicated as the first bush, is provided, as shown, with an external cylindrical bearing portion 8a which is supported in the housing as shown in FIG. 4, and has an internal bore 13 which is hexagonal in cross-sectional shape, as can be seen from FIG. 2. It forms a stop edge 14 at the place where it merges into the cavity 15 in the interior of the pinion.

The bush 7—called the second bush in the claims—has a part 16 which is also hexagonal in cross-section externally and internally, and is dimensioned in such a way that it can be inserted into the hexagonal bore 13 until it is in the stop position against the edge 14 therein, shown in FIG. 4.

At two places lying diametrically opposite each other, the part 16 is provided with a slot 17, from the end over a length which is greater than the axial length of the bore 13. The hexagonal part 16 itself is then, of course, still a little longer before it merges into the cylindrically widened part 18.

The first bush 7 is made of slightly resilient material; this can be a simple plastic, and the same plastic material will generally be used for the two bush parts 7 and 8. As a result, the two slots such as 17 mean that the two "halves" arising will spring inwards to some extent when radially inward directed forces occur. These forces arise automatically in the event of over-loading when the couple coming from the power input side 3, which is transmitted by means of the worm wheel 19 in the pinion 9 to the first bush 8, meets with too great a resistance at the output side 4. The first bush part 8 will then continue to turn with its hexagonal cavity 13, intermittently in each case, while the part 16 of the second bush 7 remains at a standstill as a result of the resistance encountered, but allows cavity 13 to continue to turn by letting itself be compressed intermittently.

The parts 7 and 8 are very simple in shape and can thus be manufactured extremely cheaply. The cost need be no higher than that of other parts which are present anyway when a drive mechanism for the same purpose is made without protection against overloading.

In the example of an embodiment shown, the ingoing (driving) and outgoing (driven) shafts are at right angles to each other. The principle of the rattling coupling according to the invention can, of course, also be applied if the ingoing and the outgoing shafts are coaxial or are positioned at an angle other than 90° relative to each other.

What is claimed is:

1. A self-contained drive mechanism for slatted blinds for transmitting rotary motion between a driving shaft and a driven shaft, comprising, in combination:

a housing having a plurality of axially aligned and spaced apart cylindrical bearing surfaces, at least one of which opens through an end wall of the housing;

a first bush disposed in the housing and having at opposite ends a pair of cylindrical bearing portions for rotatable support in two of said bearing surfaces of the housing, and having an internal bore opening through an end of the bush radially adjacent one of said cylindrical bearing portions;

said bore having walls arranged in a polygonal formation;

a gear wheel one said first bush between said cylindrical bearing portions;

a second bush disposed in the housing and made of resilient material having at one end a cylindrical bearing portion for support in said one bearing surface and having at the opposite end a projecting portion of polygonal external shape interfitting in and supported by said bore and establishing a driving connection between the two bushes;

said projecting portion of the second bush having axial slots to permit radial inward flexure of the projecting portion sufficient to cease the driving connection between the bushes when the resistance between them reaches an amount sufficient to cause said inward flexure by the polygonal shaped walls of said bore pressing against said interfitting projecting portion;

and said housing enclosing the aforesaid bushes to unify and contain the same.

2. A mechanism as in claim 1, wherein the axial slots in the second bush are longer than the depth of the internal bore of the first bush.

3. The invention defined by claim 1 wherein said second bush has at said one end a driven shaft receiving bore opening outwardly through such end and radially opposite the cylindrical bearing portion at such end.

* * * * *